United States Patent [19]

Blair

[11] 4,322,598
[45] Mar. 30, 1982

[54] METHOD FOR FORMING A CONDUIT EXTENDING THROUGH AND BEYOND OPPOSITE SIDES OF A HOUSING WALL

[75] Inventor: Robert H. Blair, Bay City, Mich.
[73] Assignee: RWC Inc., Bay City, Mich.
[21] Appl. No.: 206,057
[22] Filed: Nov. 12, 1980
[51] Int. Cl.³ .................. B23K 11/02; B23K 11/32
[52] U.S. Cl. .................. 219/107; 219/59.1; 285/189; 285/286
[58] Field of Search ............ 219/59.1, 107, 60.2, 219/119; 285/286, 189

[56] References Cited
U.S. PATENT DOCUMENTS 1,370,224  3/1921  Redding ................. 285/286 X
2,194,272  3/1940  Blu ........................ 219/107

Primary Examiner—Elliot A. Goldberg
Attorney, Agent, or Firm—Learman & McCulloch

[57] ABSTRACT

A method for forming a conduit or flow passage extending through and beyond opposite sides of a housing wall. A pair of tubes constituting the external portions of the conduit have radially projecting peripheral flanges formed at their ends. The flanges are placed in face-to-face engagement with flat surfaces on opposite sides of the wall in coaxial alignment with a bore through the wall. The flanges are then pressed against the wall by tubular welding electrodes connected in series in a welding circuit and are simultaneously welded to the wall.

4 Claims, 4 Drawing Figures

METHOD FOR FORMING A CONDUIT EXTENDING THROUGH AND BEYOND OPPOSITE SIDES OF A HOUSING WALL

BACKGROUND OF THE INVENTION

The present invention is concerned with assembly techniques required when it is necessary to pass a liquid or gaseous flow passage through a wall, such as a compressor housing, where the outer side of the tube or pipe through which the flow takes place must be sealed to the wall.

The most commonly employed technique is to drill a hole at the desired location through the housing wall, to pass a tube or pipe through the hole and to then silver solder a flanged fitting slipped around the pipe to the housing wall and to the exterior of the pipe to establish the leak-tight joint required.

The silver soldering process described above is a manually performed operation and is quite time-consuming and expensive in terms of labor and material.

The present invention is directed to a method or technique by means of which such through flow passages can be established by a simple resistance welding operation.

SUMMARY OF THE INVENTION

In accordance with the present invention, the housing wall is drilled through at the selected location to form a bore through the wall having a diameter of the desired diameter of the flow passage. If the housing wall is curved at the point through which the passage is to be formed, the wall is flattened on both sides around the region of the bore. A pair of tubes of the desired conduit internal diameter are then formed with radially projecting peripheral flanges at one end of each tube. The flanges are then placed in face-to-face engagement with opposite sides of the housing wall with the tubes in coaxial relationship with the bore. Tubular electrodes are then pressed against the flanges to press the flanges against the opposite sides of the housing wall and the electrodes are connected in a direct current series welding circuit which is then energized to simultaneously weld the flanges of the tubes to the opposite sides of the housing wall.

Other objects and features of the invention will become apparent by reference to the following specification and to the drawings.

IN THE DRAWINGS

Figure 1:
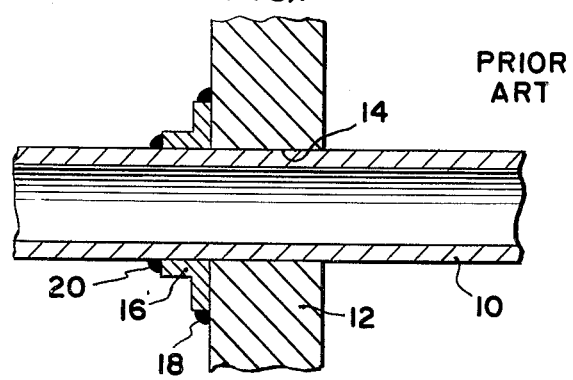
FIG. 1 is a cross-sectional view showing a conventional prior art flow passage installation.

Referring first to FIG. 1, there is shown a prior art construction wherein a tubular flow conduit 10 is passed through a housing wall 12 in leak-proof relationship to the wall. In making this assembly illustrated in FIG. 1, the first step is the formation of a bore 14 through wall 12 to receive conduit 10. The tube is then passed through bore 14 to the assembled position and the assembly is then made leak-proof by silver soldering a flange tubular fitting 16 to wall 12 as at 18 and to tube 10 as at 20. The silver soldered joints at 18 and 20 must be continuous around the entire periphery of fitting 16 in order to assure that a leak-proof installation is achieved. This requires a rather time-consuming manually performed soldering operation.

Figure 2:
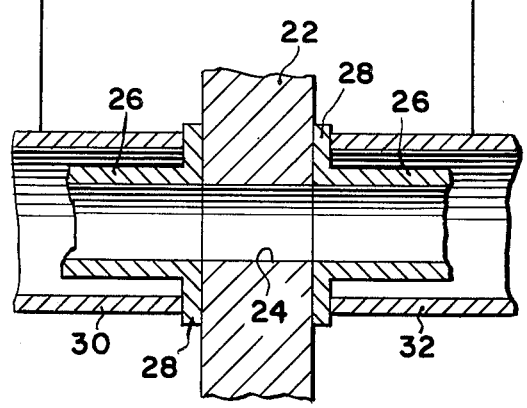
FIG. 2 is a cross-sectional view of a flow passage installation according to the present invention.

In FIG. 2 there is illustrated a method by which a through flow passage may be formed in a housing wall 22 by a more efficient technique according to the present invention.

In FIG. 2, a flow passage which extends through and beyond opposite sides of a housing wall 22 is made by first forming a bore 24 of the desired passage diameter through wall 22. A pair of tubular conduits 26 of the same internal diameter as bore 24 have radially projecting flanges 28 formed at their ends. The flanges 28 of the two tubes 26 are then placed in face-to-face engagement with the opposite sides of wall 22 with the tubes 26 in coaxial alignment with bore 24. Bore 24 thus functions as a part of the flow passage, placing the interior of the opposed tubes 26 in communication with each other.

Tubular electrodes 30, 32 are then engaged with the respective flanges 28 of the two tubes and are pressed firmly against the flanges. Electrodes 30 and 32 are electrically connected in series with a D.C. welding current source which, when energized, simultaneously welds the two flanges 28 to the opposite sides of wall 22.

Where the tubes 26 are of relatively short length and are straight, the electrodes 30 and 32 can be simple one-piece open-ended tubular members which can be axially slipped upon the tube from its free end to and from the welding position illustrated in FIG. 2. Frequently, however, one or both of the opposed tubes 26 may be of substantial length, of a curved configuration, such as a coil, or the opposite end of the tube may already have been installed on another wall so that it is not possible to slide a one-piece tubular electrode to the welding position shown in FIG. 2. In such case, a split electrode such as illustrated in FIG. 3 may be employed.

Figure 3:
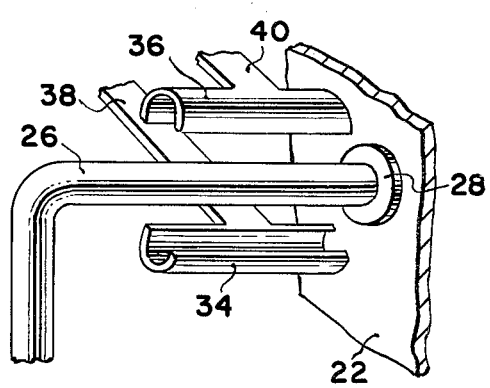
FIG. 3 is a perspective view showing a typical split electrode for practicing the present invention.

In FIG. 3, a split electrode is shown as including a pair of half tubular sections 34 and 36 located at the ends of two arms 38, 40. Arms 38 are electrically connected to each other and to one side of the welding circuit. In the FIG. 3 arrangement, the arms 38 and 40 are initially positioned as shown so that the two halves 34 and 36 are spread apart and positioned on opposite sides of the tube 26. The arms 38 and 40 are then closed so that the two halves 34 and 36 mate with each other to cooperatively form a closed tube coaxially surrounding tube 26 adjacent to the flange 28. As was the case in the FIG. 2 arrangement, the closed halves 34, 36 are then pressed or mashed downwardly against the flange as viewed in FIG. 3 and the welding operation described in connection with FIG. 2 is then performed.

Figure 4:
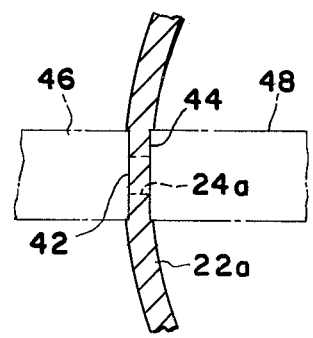
FIG. 4 is a detail cross-sectional view showing a step in the present method.

Frequently, the housing wall through which the passage is to extend may be curved, as indicated in the cross-sectional view of FIG. 4. In this situation, that portion of the curved wall through which the bore 24a is to pass is flattened as at 42, 44 prior to the drilling of bore 24a. This may be simply accomplished by a press operation in which the curved wall 22a is flattened between opposed press elements indicated in broken line at 46, 48. The flat sections 42, 44 thus formed provide a flat surface against which the flanges 28 of the tubes to be welded may be seated.

While one embodiment of the invention has been described in detail, it will be apparent to those skilled in the art that the disclosed embodiment may be modified.

Therefore, the foregoing description is to be considered exemplary rather than limiting, and the true scope of the invention is that defined in the following claims.

What is claimed is:

1. The method of forming a conduit extending through and beyond opposite sides of a housing wall comprising the steps of forming a bore of the desired internal diameter of said conduit through the housing wall, forming a radially outwardly projecting peripheral flange at one end of each of a pair of tubes having the desired internal diameter of said conduit, placing the flanges of said tubes in face-to-face engagement with said wall at opposite sides thereof with said tubes in coaxial alignment with said bore, electrically connecting said flanges in series with each other to a source of welding current, and simultaneously welding said flanges to said wall.

2. The method defined in claim 1 wherein said wall is curved further comprising the steps of forming a flat surface on both sides of said wall in the region to be engaged by said flanges.

3. The method defined in either of claims 1 or 2 wherein the step of electrically connecting said flanges comprises the step of pressing the flange against the wall by engaging the flange with the end of a hollow tubular electrode located in spaced coaxial relationship to the tube, and forcing the electrode against the flange during the welding step.

4. The method defined in claim 3 wherein the tubular electrode is split in half axially and the connecting step includes the steps of spreading the two halves of the split electrode from each other, locating the two halves at opposite sides of the tube, and moving the two halves into engagement with each other with the tube enclosed between the two halves.

* * * * *